(12) United States Patent
Krikellas et al.

(10) Patent No.: US 9,521,087 B1
(45) Date of Patent: Dec. 13, 2016

(54) SERVICING REQUESTS USING MULTIPLE DATA RELEASE CYCLES

(71) Applicant: Google Inc., Mountain View, CA (US)

(72) Inventors: Konstantinos Panteleimon Krikellas, Menlo Park, CA (US); Venkat Venugopalan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 149 days.

(21) Appl. No.: 14/495,393

(22) Filed: Sep. 24, 2014

Related U.S. Application Data (60) Provisional application No. 61/910,252, filed on Nov. 29, 2013.

(51) Int. Cl.
   G06F 15/16 (2006.01)
   H04L 12/911 (2013.01)
   G06F 17/30 (2006.01)

(52) U.S. Cl.
   CPC ....... *H04L 47/741* (2013.01); *G06F 17/30424* (2013.01)

(58) Field of Classification Search
   CPC .............. G06F 17/30312; G06F 17/30336; G06F 11/3688
   USPC ........................................................ 709/203
   See application file for complete search history.

(56) References Cited

U.S. PATENT DOCUMENTS

| | | | |
|---|---|---|---|
| 2008/0288524 A1* | 11/2008 | Dumitru | G06F 17/30312 |
| 2009/0063577 A1* | 3/2009 | Smith | G06F 17/30377 |
| 2010/0192006 A1* | 7/2010 | Gharat | G06F 11/3688 714/5.1 |
| 2013/0085999 A1* | 4/2013 | Tung | G06F 11/1451 707/654 |
| 2013/0152070 A1* | 6/2013 | Bhullar | G06F 17/30887 717/173 |

* cited by examiner

*Primary Examiner* — Tauqir Hussain
(74) *Attorney, Agent, or Firm* — Patent Law Works LLP (57) ABSTRACT

A system and method for serving requests using multiple release cycles is disclosed. The data release application includes a controller, a configuration data engine, a matching engine and a rendering engine. The controller receives a request from a client. The configuration data engine determines a set of criteria and a collection of release datasets corresponding to configuration data. The matching engine matches the request with the set of criteria and determines a combination of release cycle and release stage for servicing the request. The rendering engine retrieves a release dataset from the collection of release datasets that corresponds to the combination of release cycle and release stage and generates a response based on the release dataset.

20 Claims, 6 Drawing Sheets

SERVICING REQUESTS USING MULTIPLE DATA RELEASE CYCLES

CROSS REFERENCE TO RELATED APPLICATIONS

The present application claims priority, under 35 U.S.C. §119, of U.S. Provisional Patent Application No. 61/910,252, filed Nov. 29, 2013 and entitled "Servicing Requests Using Multiple Data Release Cycles," which is incorporated by reference in its entirety.

BACKGROUND

The disclosure relates to servicing requests for webpages using multiple data release cycles.

Pushing updates related to data files including HyperText Markup Language (HTML) templates, Cascading Style Sheet (CSS) templates, JavaScript content, etc. used by service front end and/or back end for rendering user requests can become complicated. This is particularly true when the updates are pushed out on different schedules and made available during different stages of development as part of service deployment. For example, data files used in servicing user requests may receive updates on an hourly, daily, weekly, or monthly cycle and the updates may be made available or staged for test, beta or production stage of development. A problem with the current approach is that servicing user requests at the service front end and/or back end fails to cover a matrix of release cycles and stages. It is not readily apparent which service front end and/or back end is loading what kind of data release files for servicing user requests, which negatively impacts on providing a seamless user experience.

SUMMARY

According to one innovative aspect of the subject matter described in this disclosure, a controller receives a request from a client, a configuration data engine determines a set of criteria and a collection of release datasets, a matching engine matches the request from the client with the set of criteria and determines a combination of release cycle and release stage based on matching the request with the set of criteria, and a rendering engine retrieves a release dataset from the collection of release datasets that corresponds to the first combination of release cycle and release stage and generates a response for the request based on the release dataset.

In general, another innovative aspect of the subject matter described in this disclosure may be implemented in methods that include receiving a request from a client, determining a set of criteria, determining a collection of release datasets, matching the request from the client with the set of criteria, determining a combination of release cycle and release stage based on matching the request with the set of criteria, retrieving a release dataset from the collection of release datasets that corresponds to the first combination of release cycle and release stage, and generating a response for the request based on the release dataset. Other aspects include corresponding methods, systems, apparatus, and computer program products.

These and other implementations may each optionally include one or more of the following features. For instance, the operations further include receiving an update for a base dataset including the set of criteria and for one or more release datasets in the collection of release datasets, determining whether all updated copies associated with the base dataset and the collection of release datasets are retrieved successfully, and responsive to determining that all updated copies are retrieved successfully, replacing the base dataset and the collection of release datasets with the updated copies for servicing the request. For instance, the operations further include responsive to determining that not all updated copies are retrieved successfully, discarding the updated copies associated with the base dataset and the collection of release datasets and retrieving the base dataset and the collection of datasets before the update for servicing the request. For instance, the determining includes determining the combination of release cycle and release stage from debugging parameters identified in the request and the operations further include determining whether a first server has the combination, responsive to determining that the first server does not have the combination, forwarding the request from the first server to a second server, which is capable of generating a response using the combination of release cycle and release stage identified by the debugging parameters in the request, wherein retrieving the release dataset and generating the response for the request occurs at the second server, and transmitting the response from the second server to the first server.

The features further include the client being a search client, the collection of release datasets corresponding to configuration data used for generating the response for the request, the set of criteria including criteria for determining an applicable release cycle and release stage corresponding to the request, the release cycle being an hourly release cycle, the release stage being a production release stage and the one or more debugging parameters forwarding the request from a production server instance to a test server instance to generate the response for the request.

The specification describes a data release application that services requests using multiple data release cycles, which advantageously increases the service capacity and improves resource utilization. In addition, the client does not need to be specially configured to use a particular release, as any release cycle and stage is readily available in any executing service process. Lastly, the use of debugging parameters leads to accelerated review of reported bugs and stabilizing the software implementing the service by developers. This increases the development velocity for both the front end and back end service times, as new features and bug fixes can be verified faster, while it becomes easier to triage a bug and narrow the range of code changes that may have caused it by switching between different release cycles and stages through debug parameters.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

The specification discloses a system and method for using multiple data release cycles to serve data for a request. The data release application receives a request from a client device. For example, the request can be a query to retrieve search results on a web search service. The data release application retrieves a current base dataset and a current collection of release datasets. For example, the current dataset may include a set of criteria dictating how a request could be served and the current collection of release datasets may correspond to configuration data (HyperText Markup Language (HTML) templates, JavaScript snippets, etc.) used to serve the request. Each dataset in the collection corresponds to a combination of release cycle and release stage. For example, weekly cycle/production stage, hourly cycle/beta stage, daily cycle/test stage, etc. In some instances, the data release application matches the request with the set of criteria to determine an applicable combination of release cycle and release stage for serving the request. For example, the data release application determines that a request querying a social network service from a client device matches a combination of a daily release cycle and a product release stage as per the set of criteria. In some instances, the data release application retrieves a release dataset from the collection of release datasets that corresponds to the combination. The data release application generates a response for the request based on the retrieved release dataset. For example, the data release application retrieves a web page including search results matching the query on the web search service based on the appropriate release dataset.

In some instances, the data release application receives an update to one or more release datasets in the collection of datasets related to the configuration data. The data release application updates the release datasets atomically, i.e., by requiring all updated release datasets to be loaded and retrieved successfully before serving requests. In some instances, the data release application exposes the collection that was last successfully loaded for serving requests while there is an in-flight update to the one or more release datasets in the collection. In some instances, the data release application identifies debugging parameters within a request originating from a client. The debugging parameters can override both the release cycle and release stage that is standard for serving the request as per the set of criteria. In some instances, the debugging parameters activate request forwarding from one instance of the server to another. For example, the request matches a weekly cycle/production stage combination. The debugging parameters within the request indicate a preference for hourly cycle to be used for serving the request. The data release application sends the request to a first instance of the server that can load weekly release data. The first instance of the server (for e.g., production server) then forwards the request to a second instance of the server (for e.g., test server) that loads hourly release data in addition to weekly and daily release data. The second instance of the server serves the request using the hourly release data and the first instance of the server relays the response from the second instance of the server back to the client. An advantage of request forwarding can be that all server instances (i.e., test, beta or production) can use data from multiple release cycles (i.e., hourly, daily or weekly) for serving requests regardless of a specific release dataset configured for the client originating the request.

Figure 1:
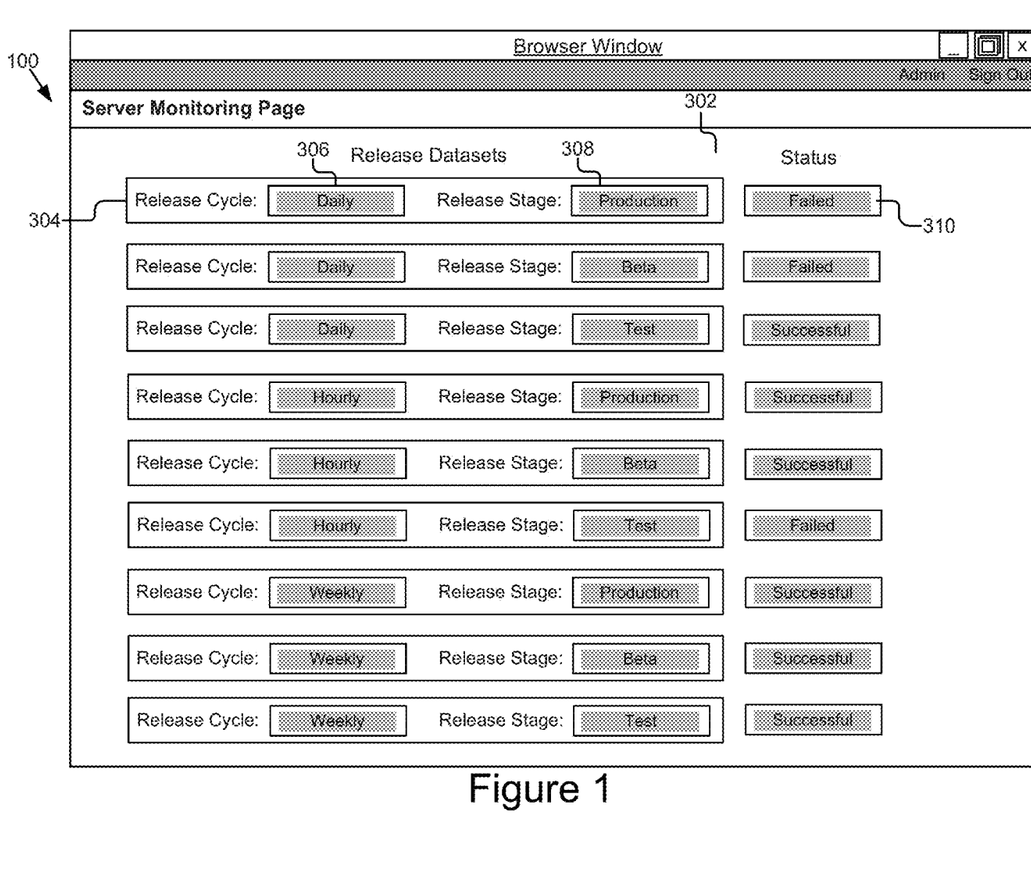
FIG. 1 is a graphic representation of an example user interface for monitoring datasets corresponding to various combinations of release cycles and release stages.

FIG. 1 illustrates a graphic representation of an example user interface 100 for monitoring datasets corresponding to various combinations of release cycles and release stages. The user interface 100 includes a monitoring page 302 for an administrator of the server 101 to review the loading of release datasets. The monitoring page 302 displays a listing of all release datasets that the server 101 can use to serve requests associated with a web service, for example, an electronic mail service, a web mapping service, a search service, etc. Each release dataset corresponds to a particular combination of release cycle and release stage. For example, the release dataset 304 is associated with daily release cycle 306 and production release stage 308. The administrator of the server 101 can identify which of the release datasets loaded successfully or failed to load properly, for example, during an update process from the monitoring page 302. The monitoring page 302 includes a status indicator 310 next to the release dataset 304 that indicates that the dataset associated with daily release cycle/production release stage failed to load properly. Other user interface examples are possible, for example, a testing user interface that lets the administrator of the server 101 generate requests from different clients and verify responses using different release cycles and release stages.

Figure 2:
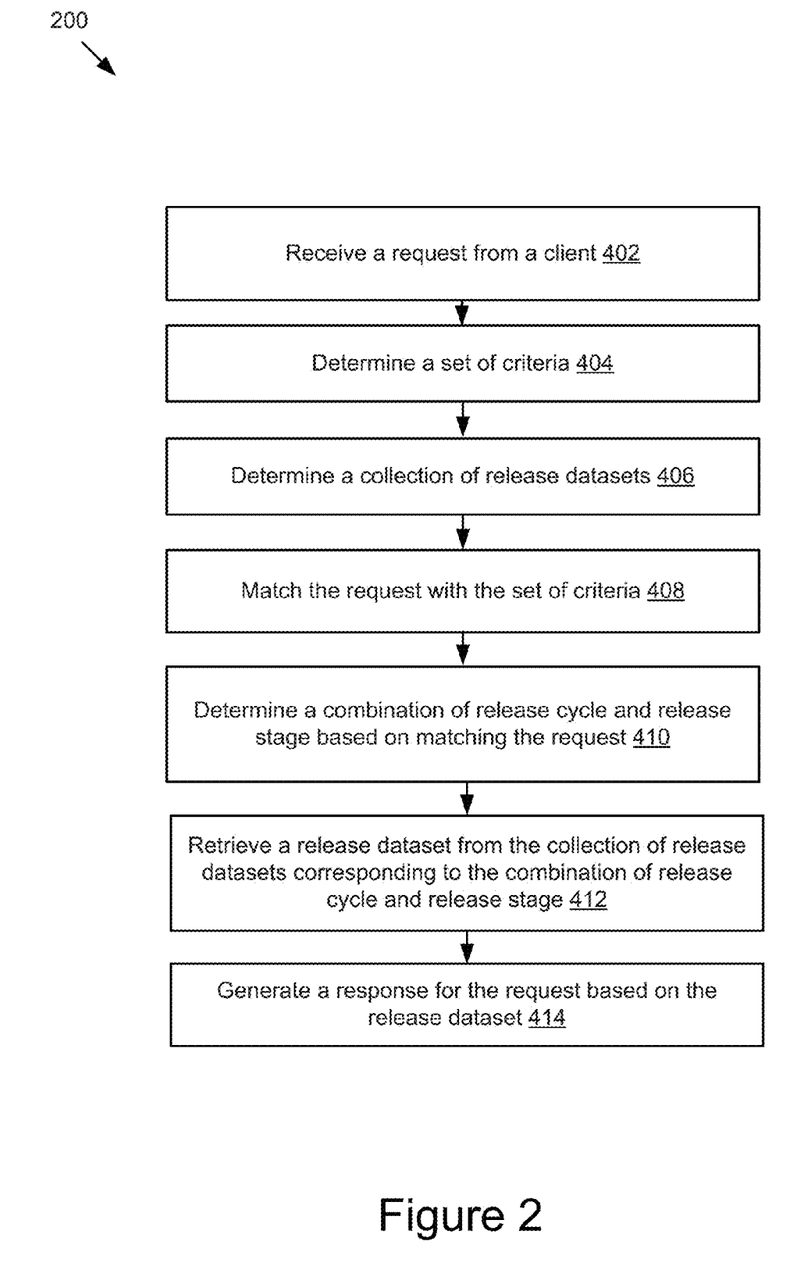
FIG. 2 is a flowchart of an example method for generating a response for a request based on a release dataset.

FIG. 2 is a flowchart 200 of an example method for generating a response for a request based on a release dataset. The data release application 103 includes a processing unit 204, a configuration data engine 206, a matching engine 208 and a rendering engine 210. The data release application 103 is described in more detail in FIG. 6. The controller 202 receives 402 a request from a client. For example, the request can be a query for retrieving results on a web search service. The configuration data engine 206 determines 404 a set of criteria. The set of criteria correspond to the configuration data and dictate a manner in which requests from users of the one or more client devices 114 may be served. The configuration data include data used for generating a response to the requests from users of one or more client devices 115. For example, the configuration data can be HyperText Markup Language (HTML) templates, JavaScript snippets, etc. The configuration data engine 206 determines 406 a collection of release datasets. The collection of release datasets correspond to the configuration data. Each dataset in the collection can correspond to a particular combination of release cycle and release stage. The release cycle defines a length in time between subsequent releases of updates, fixes, and/or enhancements to the dataset of configuration data. For example, the release cycle can be a weekly release cycle where the data release is every week, a daily release cycle where the data release is every day and an hourly release cycle where the data release is every hour. The release stage defines a rollout in stages of the release of updates, fixes, and/or enhancements to the dataset of configuration data for user consumption. For example, the release stage can be an alpha/test stage where the dataset is available only to developers and quality testers for use within the entity, a beta stage where the dataset is exposed only to employees within the entity or released to a group of individuals by invitation for testing and reporting bugs, and a production stage where the dataset is widely available for external users or customers. The matching engine 208 matches 408 the request with the set of criteria and determines 410 a combination of release cycle and release stage based on matching the request. For example, the matching engine 208 identifies that a request is from an external user querying a social network service. The matching engine 208 determines that the request matches a combination of a daily release cycle and a production release stage as per the set of criteria. The rendering engine 210 retrieves 412 a release dataset from the collection of release datasets corresponding to the combination of release cycle and release stage. For example, the rendering engine 210 retrieves a release dataset corresponding to the combination of daily release cycle and production release stage. The rendering engine 210 generates 414 a response for the request based on the release dataset. For example, the rendering engine 210 retrieves web pages of results matching a query on a search service. The web pages can be rendered based on the configuration data in the release dataset corresponding to the combination of daily release cycle and production release stage.

Figure 3:
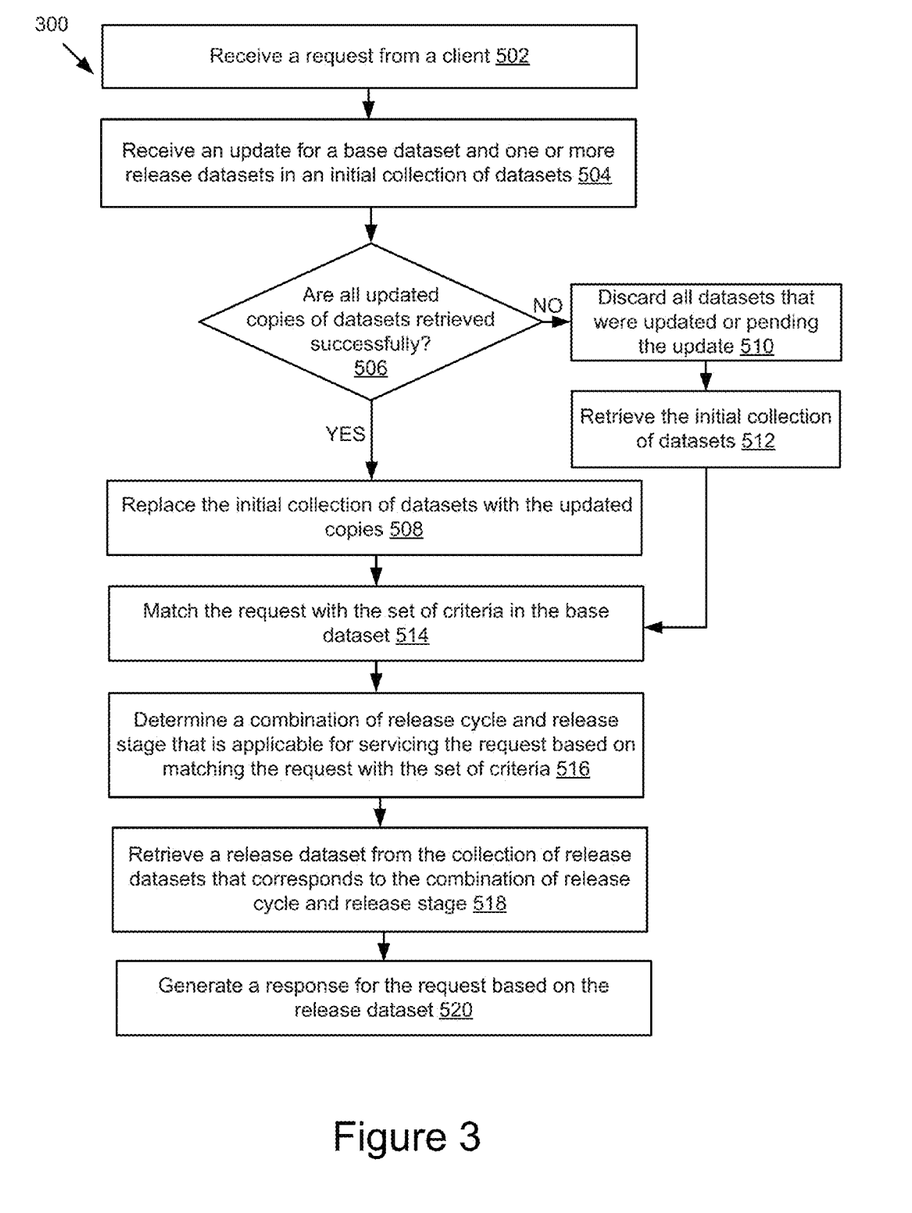
FIG. 3 is a flowchart of another example method for generating a response for a request based on a release dataset.

FIG. 3 is a flowchart 300 of another example method for generating a response for a request based on a release dataset. The data release application 103 includes a controller 202, a configuration data engine 206, a matching engine 208 and a rendering engine 210. The controller 202 receives 502 a request from a client. For example, the request can be a query for calculating a direction and distance to a destination on a web mapping service. The configuration data engine 206 receives 504 an update for a base dataset and one or more release datasets in an initial collection of datasets. For example, the update to the one or more release datasets may follow the schedules of the associated release cycles (for e.g., monthly, weekly, daily or hourly) in the one or more release datasets. The update to the base dataset including a set of criteria may be rare (for e.g., six months, one year, etc.). The set of criteria correspond to the configuration data and dictate a manner in which requests from users of the one or more client devices 114 may be served. The configuration data engine 206 determines 506 whether all updated copies of datasets are retrieved successfully. If all updated copies of datasets are retrieved successfully, the configuration data engine 206 replaces 508 the initial collection of datasets with the updated copies of datasets and proceeds to step 514.

If at least one updated copy of dataset fails to be retrieved successfully, the configuration data engine 206 discards 510 all datasets that were updated or pending the update. The configuration data engine 206 retrieves 512 the initial collection of datasets and proceeds to step 514. For example, if one dataset relating to the weekly release cycle and alpha/test release stage fails to be retrieved successfully, the configuration data engine 206 discards all other datasets, say, datasets relating to the daily release cycle and the beta release stage, datasets relating to hourly release cycle and test release stage, datasets relating to weekly release cycle and production release stage and so on.

The matching engine 208 matches 514 the request with the set of criteria in the base dataset and determines 516 a combination of release cycle and release stage that is applicable for servicing the request based on matching the request with the set of criteria. For example, the matching engine 208 identifies that the request is from an internal user (i.e., software developer) within the entity controlling the server 101 querying a web mapping service. The matching engine 208 determines that the request matches a combination of an hourly release cycle and an alpha/test release stage as per the set of criteria included in the base dataset. The rendering engine 210 retrieves 518 a release dataset from the collection of release datasets that corresponds to the combination of release cycle and release stage. For example, the rendering engine 210 retrieves a release dataset corresponding to the combination of the hourly release cycle/alpha release stage. The rendering engine 210 generates 520 a response for the request based on the release dataset. For example, the rendering engine 210 retrieves a web page of the determined map route matching the request on the web mapping service. The web page can be rendered based on the configuration data in the release dataset corresponding to the combination of hourly release cycle and test release stage.

Figure 4:
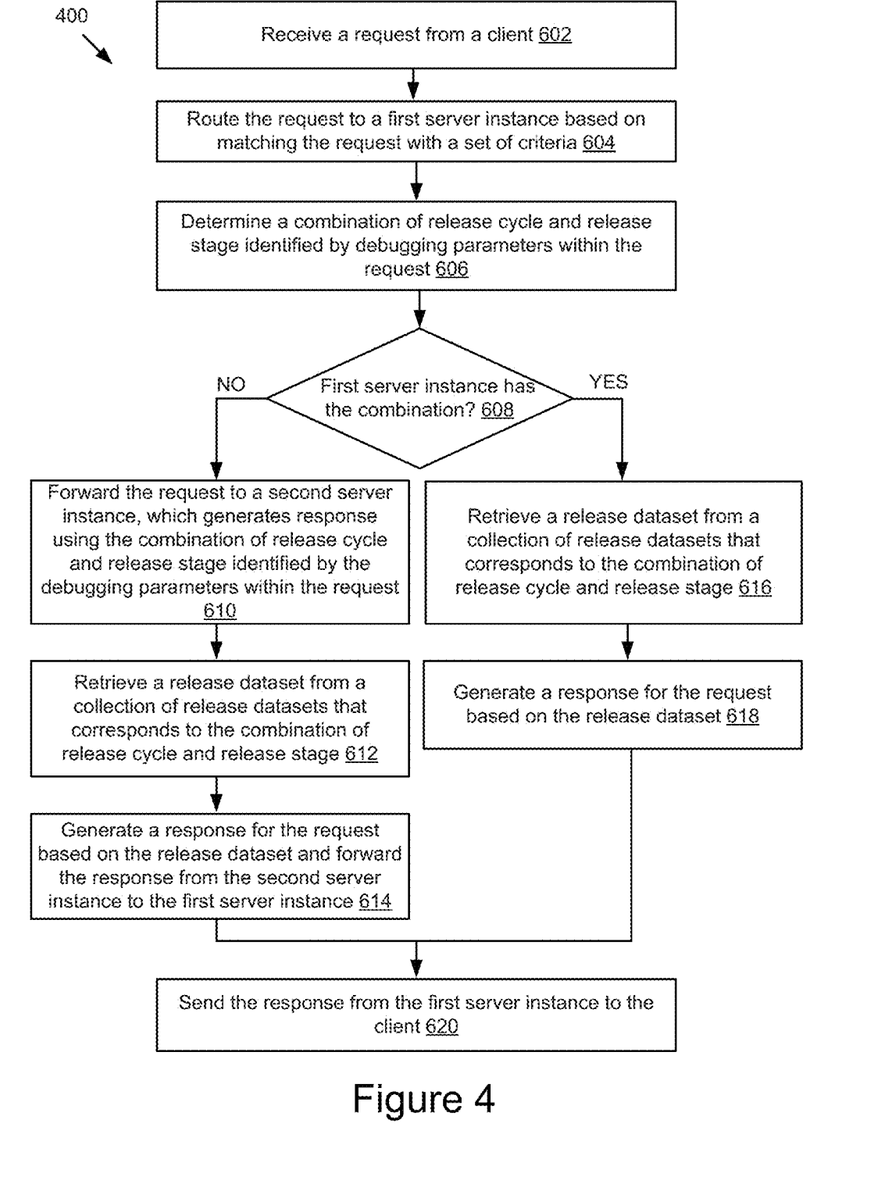
FIG. 4 is a flowchart of an example method for generating a response for a request including debugging parameters.

FIG. 4 is a flowchart 400 of an example method for generating a response for a request including debugging parameters. In some instances, the data release application 103 may include a controller 202, a configuration data engine 206, a matching engine 208 and a rendering engine 210. The controller 202 receives 602 a request from a client. For example, the request can be a query for searching an album of photographs on a social network service.

The matching engine 208 routes 604 the request to a first server 101 instance based on matching the request with a set of criteria in the base dataset. For example, the request may match a production release stage/weekly release cycle and the first server 101 instance may be a production server 101a instance. The matching engine 208 then determines 606 a combination of release cycle and release stage identified by debugging parameters within the request. The matching engine 208 determines 608 whether the first server 101 instance has the combination. The debugging parameters can override both the release cycle and release stage that can be initially applicable for servicing the request. In some instances, the request can be an internal request. For example, the debugging parameters in the internal request may specify using hourly release cycle and alpha/test release stage.

If the first server 101 instance does not have the combination, the matching engine 208 forwards 610 the request to a second server 101 instance, which generates response using the combination of release cycle and release stage identified by the debugging parameters within the request. For example, the production server 101a instance cannot service requests using an hourly release cycle, but the test server 101b (i.e., second server 101 instance) may be capable of servicing those requests. As a result, the matching engine 208 transmits the request from the production server 101a instance to the test server 101b instance. The rendering engine 210 retrieves 612 a release dataset from a collection of release datasets that corresponds to the combination of release cycle and release stage. The rendering engine 210 generates 614 a response for the request based on the release dataset and forwards the response from the second server 101 instance to the first server 101 instance. The rendering engine 210 sends 620 the response from the first server 101 instance to the client. For example, the test server 101b instance generates a response using hourly release cycle and relays the response to the production server 101a instance.

If the first server 101 instance does have the combination, the rendering engine 210 retrieves 616 a release dataset from a collection of release datasets that corresponds to the combination of release cycle and release stage. The rendering engine 210 generates 618 a response for the request based on the release dataset and proceeds to step 620. For example, the rendering engine 210 retrieves a web page including an album of photographs matching the request on the social network service. The web page can be rendered based on the configuration data in the release dataset corresponding to the combination of hourly release cycle and test release stage.

Figure 5:
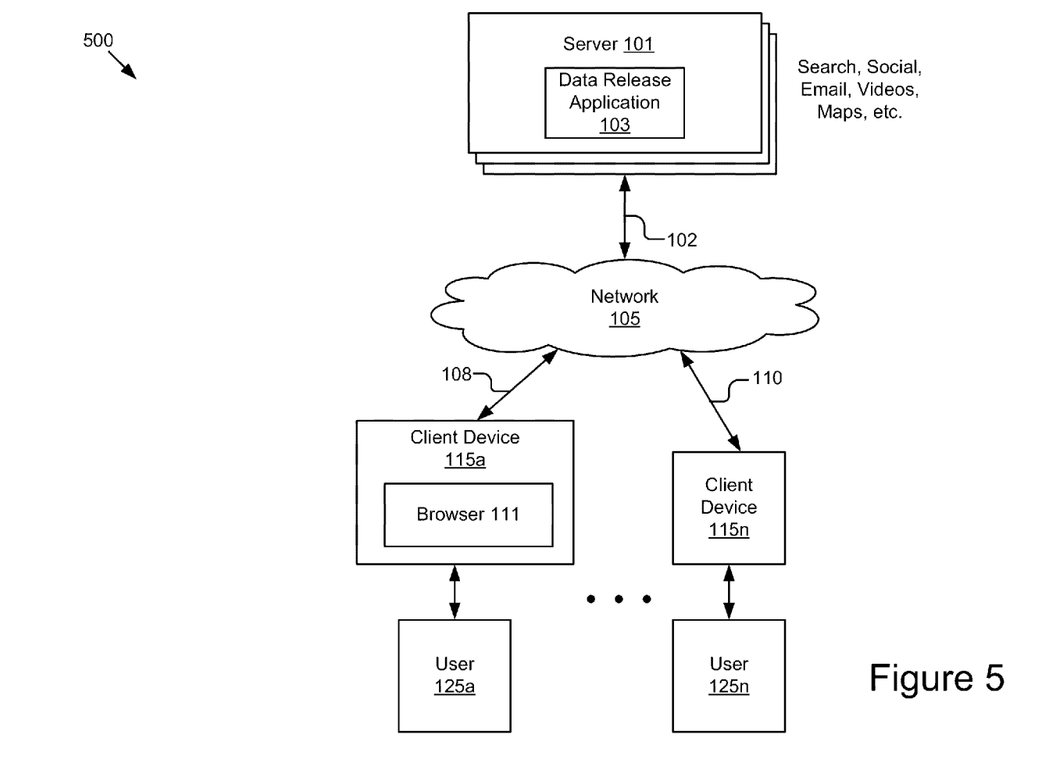
FIG. 5 is a block diagram illustrating an example system for using multiple data release cycles to serve data for a request.

FIG. 5 illustrates a block diagram of a system 500 for using multiple data release cycles to serve data for a request. The illustrated description of the system 500 includes client devices 115a . . . 115n that are accessed by users 125a . . . 125n, and a server 101. In the illustrated implementation, these entities of the system 500 are communicatively coupled via a network 105. In FIG. 5 and the remaining figures, a letter after a reference number, for example "115a" is a reference to the element having that particular reference number. A reference number in the text without a following letter, for example "115," is a general reference to any or all instances of the element bearing that reference number.

The network 105 may be a conventional type network, wired or wireless, and may have any number of configurations for example a star configuration, token ring configuration or other configurations. Furthermore, the network 105 may comprise a local area network (LAN), a wide area network (WAN) (e.g., the Internet), and/or any other interconnected data path across which multiple devices may communicate. In some instances, the network 105 may be a peer-to-peer network. The network 105 may also be coupled to or includes portions of a telecommunications network for sending data in a variety of different communication protocols. In some other instances, the network 105 includes Bluetooth communication networks or a cellular communications network for sending and receiving data for example via SMS/MMS, hypertext transfer protocol (HTTP), direct data connection, WAP, e-mail, etc. While only one network 105 is illustrated, any number of networks may be coupled to the above mentioned entities.

The client devices 115a, 115n in FIG. 5 are used by way of example. Although only two client devices 115 are illustrated, the technology applies to a system architecture having one or more client devices 115. The users 125a, 125n interact with the client devices 115a, 115n via signal lines 112a, 112n respectively. The client devices 115a, 115n are connected to the network 105 via signal lines 108, 110 respectively. The client device 115 can be any computing device that includes a memory and a processor. For example, the client device 115 can be a laptop computer, a desktop computer, a tablet computer, a mobile telephone, a personal digital assistant, a mobile email device, a portable game player, a portable music player, a television with one or more processors embedded therein or coupled thereto or any other electronic device capable of accessing the network 105, etc.

In some instances, the client device 115 includes a browser 111. The browser 111 can be code and routines stored in the memory and executed by the processor of the client device 115. The browser 111 includes any browser application that can retrieve pages hosted by the server or servers 101 (for example, the servers 101 hosting electronic mail service, search service, mapping service, video sharing service, etc.) and can present the pages on a display (not shown) on the client device 115a. In some other instances, the browser 111 retrieves and presents pages hosted by the client device 115. The term page includes documents or information resource that comprises textual elements, non-textual elements (for example, static images, animated images, audio, video, etc.), interactive elements (for example, games, buttons, hyperlinks, etc.), scripts (for example, JavaScript, code implementing Ajax techniques, etc.), metadata, etc. In some instances, the page can be a web page in a type of file format (for example, HTML, HTML5, XHTML, XML, etc.).

In some instances, a data release application 103 may be operable on the server 101, which is coupled to the network 105 via signal line 102. The server 101 can be a hardware server or servers that include a processor, a memory and network communication capabilities. The server 101 sends and receives data to and from one or more of the client devices 115a, 115n and/or other servers 101 via the network 105. In some instances, the server 101 can be an implementation making use of Representational State Transfer (REST) principles and supporting data representation in JavaScript Object Notation (JSON) format. In other instances, the server 101 can include multiple instances and each instance can include its own directory structure, configuration and deployed applications. For example, a test instance on the server 101 can be for internal quality assurance and trouble shooting and a production instance on the server 101 can be for generating a response to external requests.

In some instances, the server 101 also includes an online service application (not pictured) that can be part of the data release application 103 or a standalone application. The online service application includes software including routines that, when executed by a processor (not pictured), generates an online service that is hosted by the server 101. The online service application can be stored on a non-transitory memory associated with the server 101. The online service application can be dedicated to generating and providing content for querying users. In some instances, the online service application verifies that users requesting access to data stored in the storage device (not shown) are authorized to access the data they are requesting through the online service. For example, user authentication by matching a username and password. Once a user is authenticated, the user can access the data and/or share the data with other users.

In one example, the online service hosted by the server 101 can be a video sharing online service that plays a video responsive to receiving a user request from the client device 115. In another example, the online service can be a search service that retrieves search results in response to receiving a user query including search terms from the client device 115. In a third example, the online service can be an image hosting service that returns one or more images in response to receiving an application programming interface (API) call. Other examples of online services that provide access to content can include electronic messaging, social networks, micro-blogs, calendars, maps, weather service, current news, financial news, airline reservations, geo-location services, cloud storage services, online information database services, etc.

Furthermore, it should be understood that the server 101 may be representative of multiple servers coupled to the network 105, each having its own processor, memory, and network communication capabilities. For example, a first server 101 may be more directed to social networking, a second server 101 may be more directed to or centered on a search service, a third may be more directed to an electronic messaging service, a fourth is directed to mapping and/or map-based services and others are of general interest or a specific focus. In some instances, the data that is accessed by users may be distributed across multiple servers 101. For example, a search query from a user on a search service can retrieve search results that match the query from the social network of the user. In some other instances, the servers 101 can be at least controlled by the same entity.

In some instances, the browser 111 accesses the online service using hypertext transfer protocol (HTTP) requests and retrieves content for one or more web pages generated from the online services on the servers 101.

The data release application 103 can be software including routines. In some instances, the data release application 103 can be implemented using hardware including a field-programmable gate array (FPGA) or an application-specific integrated circuit (ASIC). In other instances, the data release application 103 can be implemented using a combination of hardware and software.

In some instances, the data release application 103 receives a request from a client. The data release application 103 determines a set of criteria and a collection of release datasets corresponding to configuration data. The data release application 103 matches the request with the set of criteria and determines a combination of release cycle and release stage. The data release application 103 retrieves a release dataset from the collection of release datasets that corresponds to the combination of release cycle and release stage and generates a response for the request based on the release dataset. The data release application 103 is described in further detail below with reference to FIG. 6.

Figure 6:
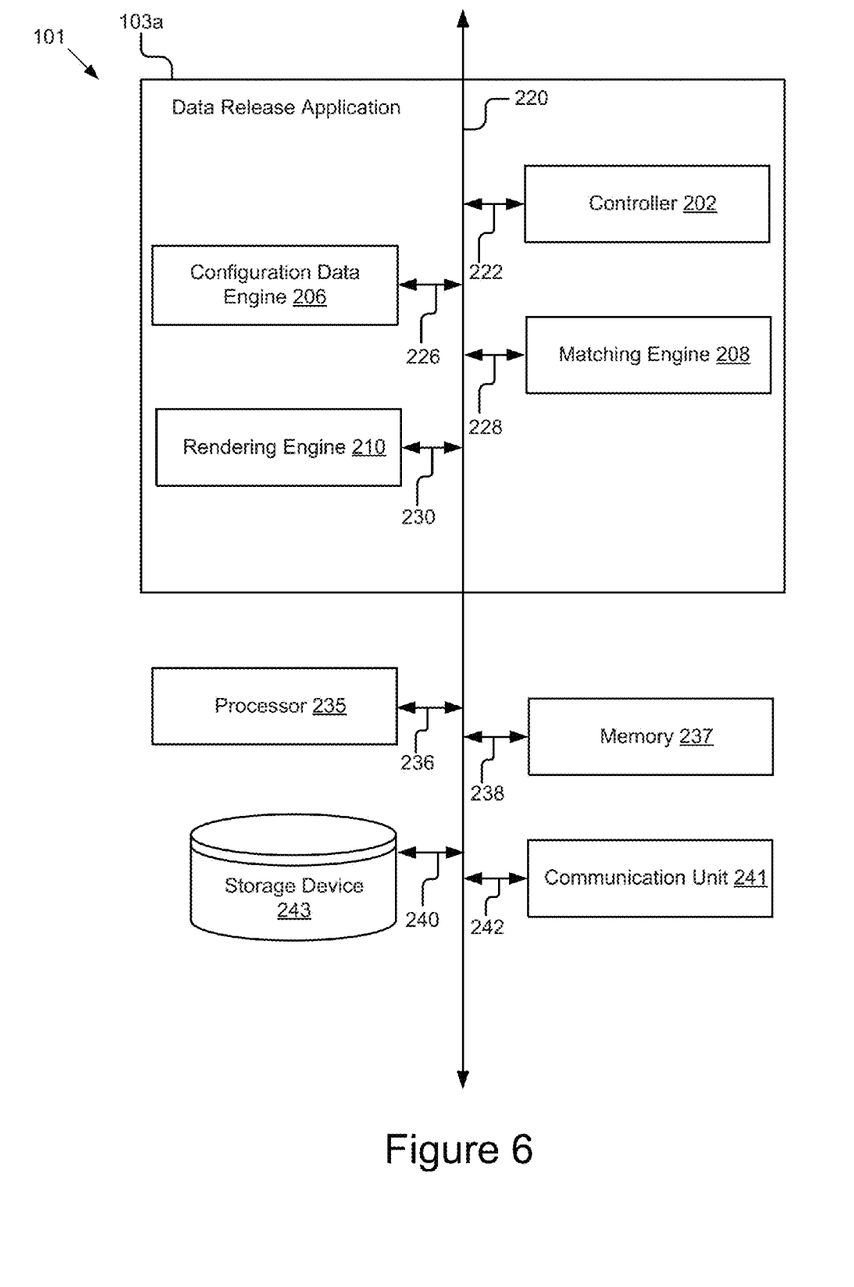
FIG. 6 is a block diagram illustrating an example data release application.

Referring now to FIG. 6, an example of the data release application 103 is shown in more detail. FIG. 6 is a block diagram of a server 101 that includes a processor 235, a memory 237, a communication unit 241 and a storage device 243 according to some implementations. The components of the server 101 are communicatively coupled by a bus 220.

The processor 235 includes an arithmetic logic unit, a microprocessor, a general-purpose controller or some other processor array to perform computations and provide electronic display signals to a display device. The processor 235 is coupled to the bus 220 via signal line 236 for communication with the other components. Processor 235 may process data signals and may comprise various computing architectures including a complex instruction set computer (CISC) architecture, a reduced instruction set computer (RISC) architecture, or an architecture implementing a combination of instruction sets. Although only a single processor is shown in FIG. 6, multiple processors may be included. The processing capability may be limited to supporting the display of images and the capture and transmission of images. The processing capability might be enough to perform more complex tasks, including various types of feature extraction and sampling. Other processors, operating systems, sensors, displays and physical configurations are possible.

The memory 237 stores instructions and/or data that may be executed by processor 235. The memory 237 is coupled to the bus 220 via signal line 238 for communication with the other components. The instructions and/or data may include code for performing any and/or all of the techniques described herein. The memory 237 may be a dynamic random access memory (DRAM) device, a static random access memory (SRAM) device, flash memory or some other memory device. In some instances, the memory 237 also includes a non-volatile memory or similar permanent storage device and media for example a disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the client device 115 and other servers 101 where the data release application 103 is stored. The communication unit 241 is coupled to the bus 220 via signal line 242. In some instances, the communication unit 241 includes a port for direct physical connection to the network 105 or to another communication channel. For example, the communication unit 241 includes a USB, SD, RJ-45 or similar port for wired communication with the client device 115. In some other instances, the communication unit 241 includes a wireless transceiver for exchanging data with the client device 115 or any other communication channel using one or more wireless communication methods, for example IEEE 802.11, IEEE 802.16, BLUETOOTH® or another suitable wireless communication method.

In some instances, the communication unit 241 includes a cellular communications transceiver for sending and receiving data over a cellular communications network for example via short messaging service (SMS), multimedia messaging service (MMS), hypertext transfer protocol (HTTP), direct data connection, WAP, e-mail or another suitable type of electronic communication. In some other instances, the communication unit 241 includes a wired port and a wireless transceiver. The communication unit 241 also provides other conventional connections to the network for distribution of files and/or media objects using standard network protocols for example TCP/IP, HTTP, HTTPS and SMTP.

The storage device 243 can be a non-transitory memory that stores data used by the data release application 103. In some instances the data is stored temporarily, for example, a cache. The storage device 243 may be a dynamic random access memory (DRAM) device, a static random access memory (SRAM) device, flash memory or some other memory device. In some instances, the storage device 243 also includes a non-volatile memory or similar permanent storage device and media for example a hard disk drive, a floppy disk drive, a CD-ROM device, a DVD-ROM device, a DVD-RAM device, a DVD-RW device, a flash memory device, or some other mass storage device for storing information on a more permanent basis. In the illustrated implementation, the storage device 243 is communicatively coupled by the bus 220 for communication with the other components of the server 101 via signal line 240. Although only one storage device is shown in FIG. 6, multiple storage devices may be included. In some other instances, the storage device 243 may not be included in the server 101 and can be communicatively coupled to the server 101 via the network 105.

In some instances, the storage device 243 stores the request associated with a client. For example, the request can be a query for retrieving results on a web search service. In some instances, the storage device 243 stores the base dataset and the one or more release datasets corresponding to the configuration data. In some other instances, the storage device 243 stores updated copies of datasets (both base and release datasets). In some instances, the storage device 243 stores a combination of release cycle and release stage determined for the request by indexing against the request. In some other instances, the storage device 243 stores an overriding combination of release cycle and release stage determined for the request based on identified debugging parameters in the request. The data stored in the storage device 243 is described below in more detail. In some instances, the storage device 243 may store other data for providing the functionality described herein.

In some instances, the data release application 103 includes a controller 202, a configuration data engine 206, a matching engine 208 and a rendering engine 210.

The controller 202 can be software including routines for receiving data via the communication unit 241, routing the data to the appropriate engine or unit and transmitting responses from the engine or unit to the communication unit 241 for transmission to the client device 115 or the servers 101. In some instances, the controller 202 can be a set of instructions executable by the processor 235 to provide the functionality described below for managing data. In some other instances, the controller 202 can be stored in the memory 237 of the server 101 and can be accessible and executable by the processor 235. In either of the instances, the controller 202 may be adapted for cooperation and communication with the processor 235 and other components of the server 101 via signal line 222.

In some instances, the controller 202 identifies the type of data being received and transmits the data to the appropriate unit or engine of the data release application 103. For example, the controller 202 receives information from the server 101 for rendering a user interface of an online service hosted by the server 101 and transmits the information to the rendering engine 210. In some other instances, the controller 202 receives user inputs and user actions submitted by the user 125 from the client device 115. The controller 202 sends the user actions and the user inputs to the appropriate engine or unit of the data release application 103. For example, the controller 202 receives a request from a user and forwards the request to the matching engine 208. The request can be a query for retrieving results on a web search service, a query for calculating a direction and distance to a destination on a web mapping service, a query to retrieve an electronic mail on an electronic mail service, a query to retrieve user generated content on a social networking website, etc. In some instances, the controller 202 stores the request from the user in the storage device 243.

In some instances, the controller 202 receives information from other components of the data release application 103 and transmits the information to the appropriate component in the system 100 via the communication unit 241. For example, the controller 202 receives a partial response generated for a user request by the rendering engine 210. The controller 202 transmits the partial response to another connecting server 101 that is part of the system 100 to generate a more complete response to the user request.

In some instances, the controller 202 receives data from components of the data release application 103 and stores the data in the storage device 243. For example, the controller 202 receives a base dataset and one or more release datasets corresponding to configuration data from the configuration data engine 206 and stores them in the storage device 243. In some other instances, the controller 202 retrieves data from the storage device 243 and sends the data to other components of the data release application 103. For example, the controller 202 retrieves one or more release datasets from the storage device 243 and transmits them to the rendering engine 210 for generating responses for queries.

The configuration data engine 206 can be software including routines for managing and updating datasets corresponding to configuration data used in generating a response for requests. In some instances, the configuration data engine 206 can be a set of instructions executable by the processor 235 to provide the functionality described below for managing and updating datasets. In some other instances, the configuration data engine 206 can be stored in the memory 237 of the server 101 and can be accessible and executable by the processor 235. In either of the instances, the configuration data engine 206 can be adapted for cooperation and communication with the processor 235, the matching engine 208, the rendering engine 210 and other components of the data release application 103 via signal line 226.

In some instances, the configuration data engine 206 receives a collection of datasets on each data release related to configuration data and caches them. The collection of datasets related to configuration data for servicing requests can be released by an entity controlling the server 101 and are herein referred to as "release datasets." For example, the release datasets can be output of established release mechanisms that use data generated by software developers within the entity as input. The configuration data can include data used for generating a response to requests from users of one or more client devices 115. For example, the configuration data can be HyperText Markup Language (HTML) templates, cascading style sheet (CSS) to HTML templates, JavaScript snippets, JavaScript, etc. Each dataset in the collection can correspond to a particular combination of release cycle and release stage. A release cycle defines a length in time between subsequent releases of updates, fixes, and/or enhancements to the dataset of configuration data. For example, the release cycle can be a weekly release cycle where a data release is every week, a daily release cycle where a data release is every day, and an hourly release cycle where a data release is every hour. A release stage defines a rollout in stages of the release of updates, fixes, and/or enhancements to the dataset of configuration data for user consumption. For example, the release stage can be an alpha/test stage where the dataset is available only to developers and quality testers for use within the entity, a beta stage where the dataset is exposed only to employees within the entity or released to a group of individuals by invitation for testing and reporting bugs, and a production stage where the dataset is widely available for external users or customers. In another example, the release stage can be a canary stage where a small number of end users receive an opportunity to try the new dataset used by a service front end and/or back end and the end users are unaware that the service front end and/or back end is being tested on servicing user requests based on the new dataset. In yet another example, the release stage can be a production stage where the new dataset used by the service front end and/or back end is released to the public at large. In some instances, the configuration data engine 206 stores the collection of release datasets in the storage device 243.

In some instances, the configuration data engine 206 receives a set of criteria corresponding to the configuration data from an administrator of the server 101. The configuration data engine 206 stores the set of criteria in a base dataset in the storage device 243. The set of criteria dictate a manner in which requests from users of the one or more client devices 115 may be serviced. For example, the requests originating from users querying a social network service may be serviced using a weekly release cycle and an alpha/test release stage as default. In a second example, the requests originating from users querying a web search service may be serviced using a daily release cycle and an alpha/test release stage as default. In a third example, the requests originating from users employed with the entity may be serviced using the beta stage and a release cycle (weekly, daily, or hourly) depending on the online service (social, search, electronic mail, etc.) the request is being directed toward. In a fourth example, the requests originating from external users (i.e. customers or public at large) may be serviced using the production stage and a release cycle depending on the online service the request is being directed toward.

In some instances, the configuration data engine 206 receives an update to one or more release datasets in the collection of datasets relating to the configuration data from the administrator of the server 101. The update to the one or more release datasets may follow the schedules of the associated release cycles (for e.g., weekly, daily or hourly) in the one or more release datasets. In some other instances, the configuration data engine 206 also receives an update to the base dataset. The update to the base dataset may be rare (for e.g., six months, one year, etc.).

To avoid data skew during rendering content for user requests, the base and release datasets are atomically updated. Using atomic updating on the multiple datasets, i.e. by requiring all updated datasets to be loaded successfully before any of them can be used for serving requests, reduces the risk of problems associated with providing the content.

In some instances, the configuration data engine 206 receives a copy of the updated datasets (base and release datasets) and also retains the initial collection of release datasets including the base dataset in the storage device 243. In some other instances, the configuration data engine 206 replaces the initial collection of release datasets including the base dataset with the updated copies of the datasets in the storage device 243. In some instances, the configuration data engine 206 determines whether all the updated datasets are retrieved successfully from the storage device 243. The configuration data engine 206 attempts to load the updated datasets (for example, creating an internal representation of the updated datasets) and performs sanity checks on them. If all the updated copies of the datasets are retrieved and loaded successfully, the configuration data engine 206 atomically replaces the initial collection of release datasets retained previously with the updated datasets to create an up-to-date collection of release datasets in the storage device 243. The updated datasets are transmitted to the rendering engine 210. If at least one updated dataset fails to be retrieved successfully, the configuration data engine 206 discards all other datasets that were updated or pending to be updated based on their respective release cycle. The configuration data engine 206 retrieves the initial collection of release datasets including the base dataset retained previously before the update. For example, if one dataset relating to the weekly release cycle and alpha/test release stage fails to be retrieved successfully, the configuration data engine 206 discards all other datasets, for example, datasets relating to the daily release cycle and beta release stage, datasets relating to the hourly release cycle and test release stage, datasets relating to weekly release cycle and production release stage and so on. For requests served while there is an in-flight update, the configuration data engine 206 exposes the collection that was last successfully loaded to the rendering engine 210 before starting the new update to the collection.

The matching engine 208 can be software including routines for matching the requests to a release stage and release cycle for servicing the requests. In some instances, the matching engine 208 can be a set of instructions executable by the processor 235 to provide the functionality described below for matching the requests. In some other instances, the matching engine 208 can be stored in the memory 237 of the server 101 and can be accessible and executable by the processor 235. In either of the instances, the matching engine 208 can be adapted for cooperation and communication with the processor 235, the configuration data engine 206, the rendering engine 210 and other components of the data release application 103 via signal line 228.

In some instances, the matching engine 208 receives the request transmitted by the controller 202. The matching engine 208 matches the request with the set of criteria in the base dataset retrieved from the storage device 243. The matching engine 208 determines a combination of release cycle and release stage relating to the configuration data that is applicable for servicing the request. In some instances, the matching engine 208 identifies a property identifier from the request, and maps the property identifier to a release cycle. The property identifier refers to the particular service being provided, for example, search, social, maps, etc. If the property identifier refers to a search service for example, then the matching engine 208 maps the request to a weekly release. If the property identifier refers to a social service for example, then the matching engine 208 maps the request to a daily release.

In some instances, the matching engine 208 determines an internet protocol (IP) address originating the request and maps the internet protocol address to a specific release stage. For example, the matching engine 208 identifies that a request is from a user querying a social network service from an external IP address (i.e., public). The matching engine 208 determines that the request matches a combination of a daily release cycle and a production release stage as per the set of criteria included in the base dataset. In another example, the matching engine 208 identifies that a request is from a user within the entity querying a web search service from an internal IP address (i.e., employee). The matching engine 208 determines that the request matches a combination of a weekly release cycle and an alpha/test release stage as per the set of criteria included in the base dataset. In some other instances, the release cycle and release stage may be decided on more complicated criteria or may be based on experimental definitions. For example, weekly release cycle can be overridden to daily release cycle for 10% of the users using the search service in the United States. In another example, production release stage can be overridden to beta or canary release stage for requests originating from internal IP addresses within the entity. In some instances, the matching engine 208 transmits the combination of release cycle and release stage determined for the request to the rendering engine 210. In some other instances, the matching engine 208 stores the combination of release cycle and release stage determined for the request in the storage device 243 indexed against the request.

In some instances, the matching engine 208 identifies debugging parameters included in the request transmitted by the controller 202. The debugging parameters override at least one of the release cycle and release stage that was initially applicable for servicing the request. In some instances, the request can be an internal request. For example, the request can be originating from an internal IP address within the entity querying a web search service. The request originating from the internal IP address matches a weekly release cycle and a production release stage combination that is normally applicable for servicing the request. The debugging parameters within the request however, require using an hourly release data instead of the weekly release data for serving the request. The matching engine 208 first sends the request to a first instance of the server 101 (for example, a production server 101a) that loads weekly release data. The production server 101a cannot load hourly release data because they may not be stable enough for serving requests. The matching engine 208 forwards the request from the production server 101a to a second instance of the server 101 (for example, a test server 101b) that is not exposed to production stage traffic and that may also load hourly release cycle in addition to weekly and daily release cycles. The test server 101b serves the request and the production server 101a relays the response from the test server 101b back to the internal client that originated the request. This way, even production sever 101a can indirectly serve hourly release data. The debugging parameters within the request activate the request forwarding from one server instance to another server instance. Another example could include the debugging parameters forcing hourly release cycle/test release stage and the matching engine 208 forwarding the request from a test server 101*b* that can load weekly release cycle to another test server 101*c* that can load hourly release cycle. An obvious advantage of this request forwarding could be that all server 101 instances (i.e., alpha, beta or production) can use data from multiple release cycles (i.e., hourly, daily or weekly) and can service requests regardless of a specific release dataset configured for the client device 115 originating the requests.

In some instances, the matching engine 208 matches the debugging parameters identified within the request from a client device 115 with a different combination of release cycle and release stage for testing and verification, irrespective of whether the client device 115 is expected to use a specific combination of release cycle and release stage. For example, the matching engine 208 determines that the request originating from the internal user within the entity includes debugging parameters that specify using an hourly release cycle and an alpha/test release stage. The matching engine 208 sends the request which would have normally been served using a production release stage and a weekly release cycle to a different instance of the server 101 (for example, a test server 101*b*) that uses an alpha/test release stage and an hourly release cycle. A response is generated by the test server 101*b* and sent back to the client that originated the request. An advantage of overriding both the release stage and release cycle through the debugging parameters can be accelerated review of reported bugs by switching between different release cycles and/or release stages and stabilizing the software implementing the online service hosted by the server 101.

In some instances, the matching engine 208 transmits the overriding combination of release cycle and release stage determined for the request to the rendering engine 210 as the new applicable combination of release cycle and release stage. In some other instances, the matching engine 208 stores the new applicable combination of release cycle and release stage determined for the request in the storage device 243 indexed against the request.

The rendering engine 210 can be software including routines for generating a response for the request that includes graphical data. In some instances, the rendering engine 210 can be a set of instructions executable by the processor 235 to provide the functionality described below for generating a response for the request. In some other instances, the rendering engine 210 can be stored in the memory 237 of the server 101 and can be accessible and executable by the processor 235. In either of the instances, the rendering engine 210 can be adapted for cooperation and communication with the processor 235, the configuration data engine 206, the matching engine 208 and other components of the data release application 103 via signal line 230.

In some instances, the rendering engine 210 receives the request transmitted by the controller 202. The rendering engine 210 retrieves an up-to-date collection of release datasets including the base dataset relating to the configuration data from the storage device 243 before servicing the request. For example, the rendering engine 210 retrieves a copy of the updated datasets including the base and the one or more release datasets. The rendering engine 210 generates visual components on served web pages in response to the request using HTML, JS and CSS that is returned to the client device 115 based on the release datasets.

In some instances, the rendering engine 210 receives a combination of release cycle and release stage determined applicable for servicing the request from the matching engine 208. In some other instances, the rendering engine 210 receives an overriding combination of release cycle and release stage determined based on the debugging parameters included in the request from the matching engine 208. The rendering engine 210 retrieves a release dataset from the collection of release datasets that corresponds to the combination of release cycle and release stage. For example, the rendering engine 210 retrieves a release dataset catering to a daily release cycle/production release stage corresponding to the combination of daily release cycle and production release stage determined applicable for serving a request. In some instances, the rendering engine 210 generates a response for the request based on the release dataset retrieved. For example, the rendering engine 210 retrieves web pages of results matching a query on a web search service. The web pages including the results can be rendered based on the configuration data in the release dataset. In another example, the rendering engine 210 retrieves a map indicating a calculated distance to a destination matching a query on a web mapping service. The web page including the map can be rendered based on the configuration data in the release dataset.

In some instances, the rendering engine 210 generates graphical data to present a user interface to a server administrator to receive inputs relating to selecting release datasets assigned for one or more service front ends and/or back ends. In some other instances, the rendering engine 210 generates graphical data for retrieved content based at least in part on instructions from the online service hosted by the server 101. For example, the rendering engine 210 generates graphical data for displaying electronic mail, search results, weather forecasts, location history, maps, etc. The rendering engine 210 sends the graphical data to an application (e.g., a browser 111) in the client device 115 via the communication unit 241 causing the application to display the data in a user interface. In some instances, the rendering engine 210 receives instructions from the matching engine 208 to generate graphical data indicating types of release datasets that fail to retrieve properly for a server administrator to review.

Reference in the specification to "some instances" or "an instance" means that a particular feature, structure, or characteristic described in connection with the instance is included in at least some instances of the description. The appearances of the phrase "in some instances" in various places in the specification are not necessarily all referring to the same instance.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms for example "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instance, an entirely software instance or an instance containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. It should be understood that the specification may be implemented in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware or any combination of the three. Also, wherever a component, an example of which is a module, of the specification is implemented as software, the component can be implemented as a stand-alone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
    receiving, using one or more computing devices, a request from a client device;
    determining, using the one or more computing devices, a set of criteria associated with an online service;
    matching, using the one or more computing devices, the request with the set of criteria;
    determining, using the one or more computing devices, a first combination of release cycle and release stage of the online service based on matching the request with the set of criteria;
    identifying, using the one or more computing devices, a first release dataset from a collection of release datasets, the first release dataset corresponding to the first combination of release cycle and release stage of the online service;
    determining, using the one or more computing devices, a first server instance of the online service, the first server instance of the online service configured to service the request based on the first release dataset;
    sending, using the one or more computing devices, the request to the first server instance of the online service;
    generating, using the one or more computing devices, a response for the request by the first server instance of the online service; and
    transmitting, using the one or more computing devices, instructions to the client device that cause a display of the response.

2. The method of claim 1, further comprising:
identifying a base dataset including the set of criteria;
receiving an update for the base dataset and the collection of release datasets;
determining whether updated copies associated with the base dataset and the collection of release datasets are retrieved successfully for servicing the request; and
responsive to determining that the updated copies are retrieved successfully, replacing the base dataset and the collection of release datasets with the updated copies for servicing the request.

3. The method of claim 2, further comprising:
responsive to determining that the updated copies are not retrieved successfully, discarding the updated copies associated with the base dataset and the collection of release datasets; and
retrieving the base dataset and the collection of datasets before the update for servicing the request.

4. The method of claim 1, further comprising:
identifying a debugging parameter in the request;
determining a second combination of release cycle and release stage of the online service based on matching the debugging parameter in the request with the set of criteria;
identifying a second release dataset in the collection of release datasets, the second release dataset corresponding to the second combination of release cycle and release stage of the online service;
determining whether the first server instance of the online service is configured to service the request based on the second release dataset;
responsive to determining that the first server instance of the online service is not configured to service the request based on the second release dataset, determining a second server instance of the online service, the second server instance of the online service configured to service the request based on the second release dataset and forwarding the request from the first server instance of the online service to the second server instance of the online service;
generating the response for the request by the second server instance of the online service; and
transmitting the response from the second server instance of the online service to the first server instance of the online service.

5. The method of claim 1, wherein generating the response is based on configuration data in the first release dataset.

6. The method of claim 5, wherein the configuration data includes one from a group of HyperText Markup Language templates, JavaScript snippets, and Cascading Style Sheets.

7. The method of claim 1, wherein matching the request with the set of criteria includes matching an Internet protocol address of the client device with the set of criteria.

8. The method of claim 1, wherein the release cycle includes one from a group of an hourly release cycle, a daily release cycle, a weekly release cycle, and a monthly release cycle.

9. The method of claim 1, wherein the release stage includes one from a group of an alpha release stage, a beta release stage, and a production release stage.

10. The method of claim 4, wherein the debugging parameter in the request override the first combination of release cycle and release stage of the online service.

11. A system comprising:
one or more processors;
a memory storing instructions that, when executed by the one or more processors cause the system to:
receive a request from a client device;
determine a set of criteria associated with an online service;
match the request with the set of criteria;
determine a first combination of release cycle and release stage of the online service based on matching the request with the set of criteria;
identify a first release dataset from a collection of release datasets, the first release dataset corresponding to the first combination of release cycle and release stage of the online service;
determine a first server instance of the online service, the first server instance of the online service configured to service the request based on the first release dataset;
send, using the one or more computing devices, the request to the first server instance of the online service;
generate a response for the request by the first server instance of the online service; and
display the response on the client device.

12. The system of claim 11, wherein the instructions further cause the system to:
identify a base dataset including the set of criteria;
receive an update for the base dataset and the collection of release datasets;
determine whether updated copies associated with the base dataset and the collection of release datasets are retrieved successfully for servicing the request; and
responsive to determining that the updated copies are retrieved successfully, replace the base dataset and the collection of release datasets with the updated copies for servicing the request.

13. The system of claim 12, wherein the instructions further cause the system to:
responsive to determining that the updated copies are not retrieved successfully, discard the updated copies associated with the base dataset and the collection of release datasets; and
retrieve the base dataset and the collection of datasets before the update for servicing the request.

14. The system of claim 11, wherein the instructions further cause the system to:
identify a debugging parameter in the request;
determine a second combination of release cycle and release stage of the online service based on matching the debugging parameter in the request with the set of criteria;
identify a second release dataset in the collection of release datasets, the second release dataset corresponding to the second combination of release cycle and release stage of the online service;
determine whether the first server instance of the online service is configured to service the request based on the second release dataset;
responsive to determining that the first server instance of the online service is not configured to service the request based on the second release dataset, determine a second server instance of the online service, the second server instance of the online service configured to service the request based on the second release dataset, and forward the request from the first server instance of the online service to the second server instance of the online service;

generating the response for the request by the second server instance of the online service; and transmitting the response from the second server instance of the online service to the first server instance of the online service.

15. The system of claim 14, wherein the debugging parameter in the request override the first combination of release cycle and release stage of the online service.

16. A computer program product comprising a non-transitory computer usable medium including a computer readable program, wherein the computer readable program when executed on a computer causes the computer to perform steps comprising:

receiving a request from a client device;

determining a set of criteria associated with an online service;

matching the request with the set of criteria;

determining a first combination of release cycle and release stage of the online service based on matching the request with the set of criteria;

identifying a first release dataset from a collection of release datasets, the first release dataset corresponding to the first combination of release cycle and release stage of the online service;

determining a first server instance of the online service, the first server instance of the online service configured to service the request based on the first release dataset;

sending the request to the first server instance of the online service;

generating a response for the request by the first server instance of the online service; and transmitting instructions to the client device that cause a display of the response.

17. The computer program product of claim 16, wherein the computer readable program when executed on the computer further causes the computer to perform steps comprising:

identifying a base dataset including the set of criteria;

receiving an update for the base dataset and the collection of release datasets;

determining whether updated copies associated with the base dataset and the collection of release datasets are retrieved successfully for servicing the request; and responsive to determining that the updated copies are retrieved successfully, replacing the base dataset and the collection of release datasets with the updated copies for servicing the request.

18. The computer program product of claim 17, wherein the computer readable program when executed on the computer further causes the computer to perform steps comprising:

responsive to determining that the updated copies are not retrieved successfully, discarding the updated copies associated with the base dataset and the collection of release datasets; and retrieving the base dataset and the collection of datasets before the update for servicing the request.

19. The computer program product of claim 16, wherein the computer readable program when executed on the computer further causes the computer to perform steps comprising:

identifying a debugging parameter in the request;

determining a second combination of release cycle and release stage of the online service based on matching the debugging parameter in the request with the set of criteria;

identifying a second release dataset in the collection of release datasets, the second release dataset corresponding to the second combination of release cycle and release stage of the online service;

determining whether the first server instance of the online service is configured to service the request based on the second release dataset;

responsive to determining that the first server instance is not configured to service the request based on the second release dataset, determining a second server instance of the online service, the second server instance of the online service configured to service the request based on the second release dataset and forwarding the request from the first server instance of the online service to the second server instance of the online service;

generating the response for the request by the second server instance of the online service; and transmitting the response from the second server instance of the online service to the first server instance of the online service.

20. The compute program product of claim 19, wherein the debugging parameter in the request override the first combination of release cycle and release stage of the online service.

* * * * *

UNITED STATES PATENT AND TRADEMARK OFFICE
CERTIFICATE OF CORRECTION

| | | |
|---|---|---|
| PATENT NO. | : 9,521,087 B1 | Page 1 of 1 |
| APPLICATION NO. | : 14/495393 | |
| DATED | : December 13, 2016 | |
| INVENTOR(S) | : Konstantinos Panteleimon Krikellas and Venkat Venugopalan | |

It is certified that error appears in the above-identified patent and that said Letters Patent is hereby corrected as shown below:

In the Specification

Column 1, Line 33, delete "on"

In the Claims

Column 22, Line 43, Claim 20 replace "compute" with --computer--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*